United States Patent [19]
Yang

[11] Patent Number: 5,337,228
[45] Date of Patent: Aug. 9, 1994

[54] DIFFERENTIAL CHARGING CIRCUIT

[76] Inventor: Tai-Her Yang, 5-1 Taipin St., Si-Hu Town, Dzan-Hwa, Taiwan

[21] Appl. No.: 862,715

[22] Filed: Apr. 3, 1992

[51] Int. Cl.⁵ .......................................... H02M 7/155
[52] U.S. Cl. ...................................... 363/86; 363/46; 363/128; 320/59; 320/DIG. 2
[58] Field of Search ............... 320/51, 57, 59, DIG. 2; 363/45, 46, 84, 85, 86, 89, 125, 127, 128; 323/265, 282, 284, 299

[56] References Cited

U.S. PATENT DOCUMENTS

| | | | |
|---|---|---|---|
| 3,241,044 | 3/1966 | Mills | 363/85 |
| 3,305,755 | 2/1967 | Walsh | 320/59 |
| 3,369,167 | 2/1968 | Hanchett | 363/86 |
| 3,376,488 | 4/1968 | Walsh | 320/57 |
| 3,412,314 | 11/1968 | Crane | 363/86 |
| 3,636,434 | 1/1972 | Beuk et al. | 363/128 |
| 3,733,535 | 5/1973 | Ballman | 320/DIG. 2 |
| 3,736,490 | 5/1973 | Fallon et al. | 320/59 |
| 3,781,632 | 12/1973 | Charboneau | 320/51 |
| 3,970,913 | 7/1976 | Heindl | 320/DIG. 2 |
| 4,118,768 | 10/1978 | Wilson | 363/85 |
| 4,607,324 | 8/1986 | Gibbons | 363/128 |
| 4,698,580 | 10/1987 | Yang | 320/59 |
| 4,774,449 | 9/1988 | Elkins | 320/59 |
| 5,111,379 | 5/1992 | Sharber et al. | 363/128 |
| 5,214,369 | 5/1993 | McCrea | 320/59 |

Primary Examiner—Jeffrey L. Sterrett
Attorney, Agent, or Firm—Leonard Bloom

[57] ABSTRACT

A differential charging circuit comprising an active switch device controlled by a differential trigger circuit and a current impedance device to charge a storage battery through an intermediate storage capacitor. A capacitor and commutating inductance are also connected in series with the output to reduce ripple. The differential active switch device is controlled based on a reference potential developed across the current impedance device, and this enables frequency-controlled charging of the storage battery through the commutating type inductance.

17 Claims, 1 Drawing Sheet

DIFFERENTIAL CHARGING CIRCUIT

FIELD OF THE INVENTION

The present invention relates to battery charging systems, and more particularly, to a self-regulating battery charger with differential frequency adjustment of the charging current.

BACKGROUND OF THE INVENTION

Conventional storage batteries are generally charged by a commutated AC power supply. To properly charge such batteries, the following constraints should be met: (1) the charging current should be gradually reduced (rather than sharply); (2) the charging voltage should be maintained at a set differential relative to the storage battery (about 1.35 times); and (3) charging should be prolonged over a longer duration.

In order to gradually reduce the charging current as in (10 above, prior art chargers often gradually raise the charging voltage short of exceeding the 1.35X voltage differential per the second constraint (2) above. The charging time can be minimized by reducing the ripple of the input power supply. The ripple has previously been reduced by incorporating various filters and active devices. Unfortunately, the conventional approach results in a multitude of circuit components and a high production cost.

SUMMARY OF THE INVENTION

The present invention relates to a differential charging circuit comprising an active switch device controlled by a differential trigger circuit and a current impedance device to charge a storage battery through an intermediate storage capacitor.

In addition, a capacitor and commutating inductance are connected in series with the output to reduce ripple.

The differential active switch device is controlled based on a reference potential developed across the current impedance device. This enables each end of the storage capacitor to appear at steady potential and to charge the storage battery through the commutating type inductance.

The differential charging circuit of the present invention can be used with a discontinuous pulse DC power supply or continuous DC power supply. In the former case, a solid thyristor is used for the active switch device, and in the latter case, a power transistor is used for the active switch device.

The differential charging circuit of the present invention provides an output which is independent of the pulse value of the DC power supply, and yet minimizes ripple to the storage battery so as to promote efficiency.

DETAILED DESCRIPTION OF THE INVENTION

Figure 1:
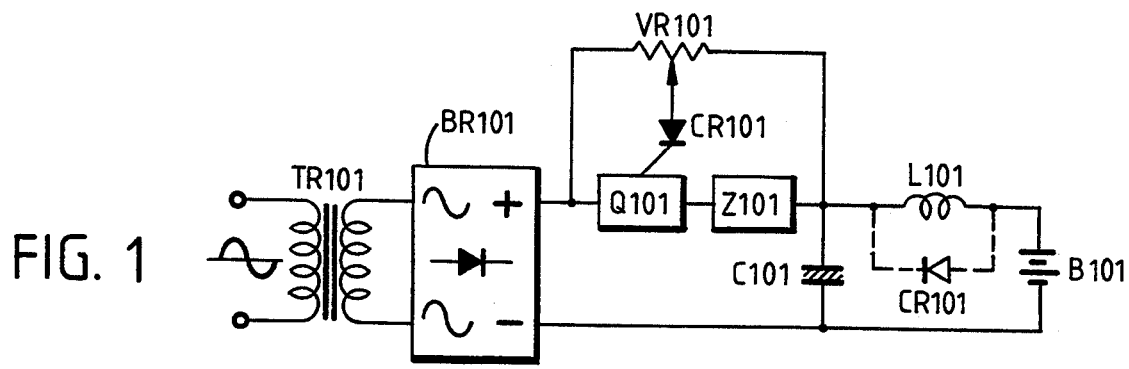
FIG. 1 is a block circuit diagram of a differential charging circuit according to a first half-wave rectified embodiment of the present invention.

FIG. 1 shows a differential charging circuit according to the present invention, including:

a transformer TR101 for converting input power from a local AC power supply to the required voltage;

a bridge type rectifier BR101 connected to transformer TR101 for converting the AC input power into pulsed DC;

an active switch device Q101 connected to the positive terminal of rectifier BR101 for selective switching of the DC positive voltage from rectifier BR101. Switch Q101 is gated by a differential trigger circuit to be described.

The output of switch Q101 is connected to a current impedance device Z101.

A capacitor C101 is coupled in parallel between the current impedance device Z101 and the negative terminal of rectifier BR101 for storing energy and reducing ripple, and an inductance L101 is connected to the junction of the capacitor C101 and current impedance device Z101.

The active switch device Q101 may comprise a conventional thyristor SCR or power transistor. The thyristor SCR may be used with a discontinuous pulsed DC power supply, and a power transistor may be used with both a continuous DC power supply and discontinuous pulse DC power supply.

A differential trigger circuit controls switching of active switch device Q101. The illustrated differential trigger circuit comprises an adjustable resistance VR101 for providing an adjustable voltage reference. Alternatively, a fixed voltage reference may be provided by at least two series-connected fixed resistances. In either case, the differential trigger circuit also includes a diode CR101 (or Zener diode) that is connected as shown between the control input of the active switch device Q101. If the active switch device Q101 is a thyristor, then the control input is the gate of the thyristor; if the active switch device is a power transistor, then the control input is the base electrode (PIN B) of the power transistor.

Figure 2:
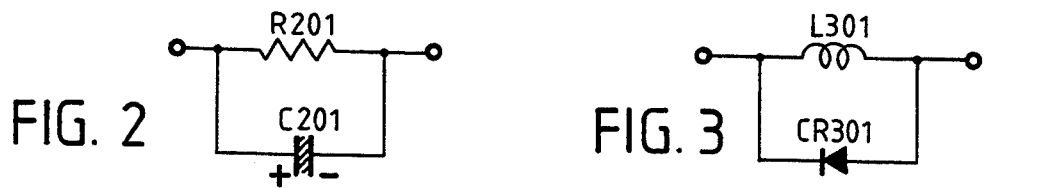
FIG. 2 is a first embodiment of a current impedance device suitable for use as Z101 in FIG. 1, the detection device comprising a resistance R201 in parallel with a capacitor C201.
Figure 3:
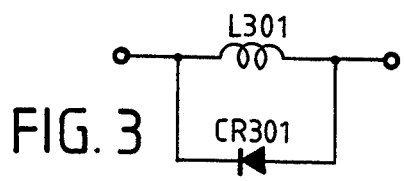
FIG. 3 is a second embodiment current impedance device suitable for use as Z101 in FIG. 1, the detection device comprising inductance L301 in parallel with a protective diode CR301.

FIGS. 2 and 3 illustrate two possible configurations of the current impedance device Z101 of FIG. 1. As seen in FIG. 2, the current impedance device Z101 may comprise a resistance R201 connected in parallel to a capacitor C201. Alternatively, as shown in FIG. 3, the current impedance device may be an inductance L301 or combination inductance-resistance type device connected in parallel with a protective diode CR301.

In any case, the current impedance device Z101 serves to generate a voltage drop of a magnitude which is dependent on the output current. The current impedance device Z101 also introduces a trigger delay which postpones the differential trigger circuit VR101,CR101 in actuating the active switch device Q101.

In addition, a commutating type inductance L101 is connected in series connected between the current impedance device and the storage battery B101 to be charged. Inductance L101 also serves to reduce ripple value of the charging current, and an optional second protective diode CR111 may be connected in parallel across inductance L101 (as shown in dotted lines).

The storage battery B101 to be charged is a conventional storage battery that is connected in parallel across the output end of the commutating type inductance L101 and the negative power supply input.

In operation, the above-described circuit maintains a regulated power charge in the capacitor C101, and the stored charge is discharged as necessary to storage battery B101 through commutating type inductance L101. When battery B101 is not fully charged the residual voltage across capacitor C101 sets up a differential across resistance VR101 of the differential trigger circuit at each pulse cycle of the power supply. When the differential value across VR101 exceeds a predetermined threshold active switch device Q101 will be triggered. However, given half-wave rectified power, the voltage drop across current impedance device Z101 will introduce a delay after active switch device Q101 is turned on. Since current impedance device Z101 produces a voltage drop proportional to the charging current, the larger the charging current drawn by battery B101, the larger the voltage drop across current impedance device Z101. Hence, the current impedance device Z101 produces a voltage drop subject to the value of the charging current and introduces a trigger delay in proportion thereto. If the charging current and voltage drop across Z101 are too large, then current impedance device Z101 will prevent triggering of Q101 and this will prevent further charging of capacitor C101 until it is discharged to battery B101, thereby reducing the potential difference.

Figure 4:
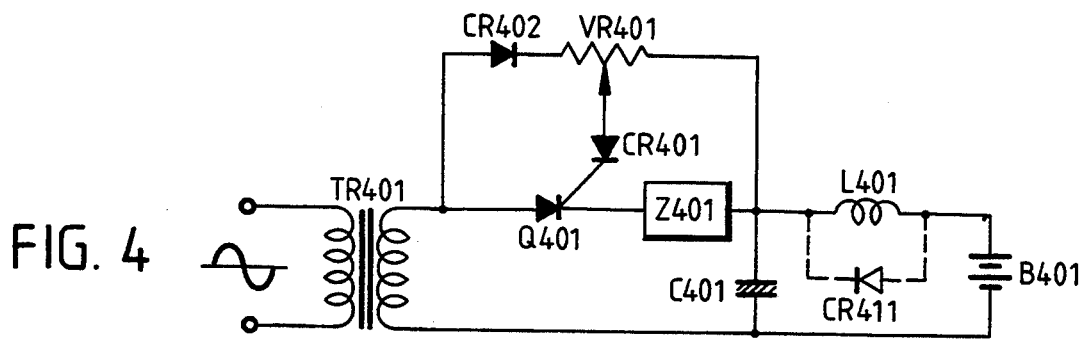
FIG. 4 is a full-wave embodiment of the differential charging circuit of the present invention which eliminates the half-wave rectifier BR101 of FIG. 1 and incorporates a silicon controlled rectifier (SCR) Q401.

FIG. 4 shows an exemplary full-wave embodiment which eliminates the rectifier BR101 in the circuit of FIG. 1.

Transformer TR401 converts the voltage value of a local AC power supply into the required voltage.

The active switch device Q401 (corresponding to Q101 of FIG. 1) is accomplished with a conventional thyristor SCR or power transistor connected at one end as shown to the DC positive voltage input. Thyristor Q401 also has a gate input connected to resistance VR401 of the differential trigger circuit for control thereby. The thyristor Q401 is also connected to the current impedance device Z401, which current impedance device Z401 is in turn connected through capacitor C401 to the negative power input. The output of the current impedance device Z101 is also connected to commutating type inductance L401.

The differential trigger circuit further comprises a variable resistance VR101 as shown, or alternatively, at least two fixed resistances connected at one end to a diode CR402, and connected at its tap or intermediate point through diode CR401 (or Zener diode) to the control input of thyristor Q401, i.e. the gate input.

Again, the current impedance device Z401 may comprise a resistance R201 in parallel to the] with capacitor C201 as in FIG. 2, or alternatively, inductance L301 (or inductance-resistance combination in parallel with protective diode CR301 as in FIG. 3, in either case to postpone the differential trigger circuit VR401, CR401 from actuating the active switch device Q101 when the charging current exceeds a predetermined threshold.

As before, a commutating type inductance L401 is connected in series between the current impedance device Z401 and storage battery B401 so as to reduce ripple.

The storage battery B401 is connected in parallel between the output end of the commutating type inductance L401 and the negative end of power supply.

The operation of the above-described circuit is similar to the above-described half-wave rectified embodiment of FIG. 1 except that the frequency of electrical energy replenished is adjusted by the differential trigger circuit VR101 and CR101 in accordance with a half-cycle of the full wave.

Figure 5:
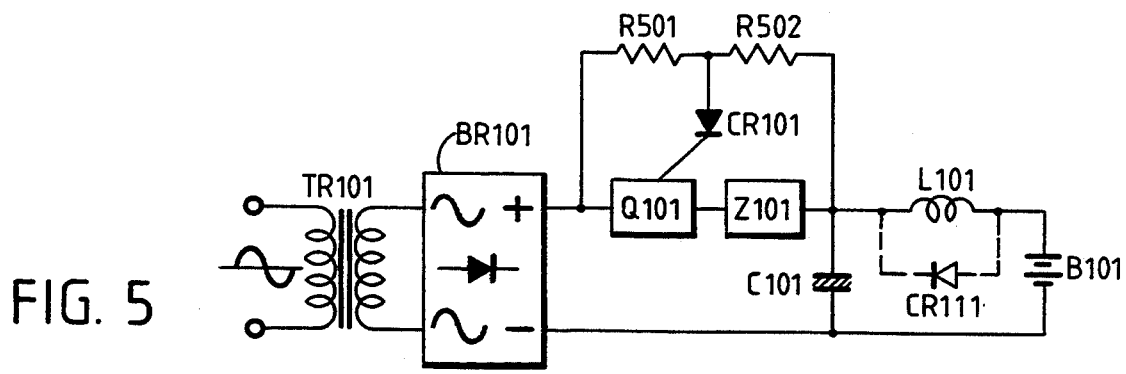
FIG. 5 corresponds to FIG. 1 but shows a tapped resistance in lieu of a variable resistance.

FIG. 5 is a modification of FIG. 1 in which the variable resistance VR101 has been replaced with a tapped resistance including resistor R501 and R502.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

What is claimed:

1. A differential charging circuit for applying charging current to a storage battery comprising:
   a transformer for amplitude modulation of AC input power, said transformer having a pair of primary terminals and a pair of secondary terminals;
   a bridge rectifier connected in parallel across said pair of transformer secondary terminals for converting the AC input power into pulsed DC;
   an active switch device having an input connected to a positive output of said bride rectifier, an output, and a gate for selective switching of the pulsed DC;
   a current impedance device connected at one end to the output of said active switch device;
   a storage capacitor connected between another end of said current impedance device and the negative output of said bridge rectifier for storing energy and reducing ripple; and
   a differential trigger circuit comprising a tapped resistance connected in parallel across the series-connected active switch and current impedance devices, and a diode connected between a tap lead of said tapped resistance and the gate of said active switch device for controlling switching of said pulsed DC through said active switch and current impedance devices in accordance with a potential developed across said tapped resistance;
   whereby said current impedance device delays switching of said active switch device and thereby frequency modulates a charging current output therefrom relative to said pulsed DC.

2. The differential charging circuit according to claim 1 wherein a negative terminal of a storage battery to be charged may be connected to said negative output of said bridge rectifier, and a positive terminal of said storage battery may be coupled to the interconnection of said current impedance and said storage capacitor.

3. The differential charging circuit according to claim 2 wherein said positive terminal of said storage battery is coupled between said current impedance and storage capacitor via a commutating inductance.

4. The differential charging circuit according to claim 3 further comprising a protective diode connected in parallel with said commutating inductance.

5. The differential charging circuit according to claim 1 wherein said tapped resistance further comprises a variable resistance with tap lead.

6. The differential charging circuit according to claim 1 wherein said tapped resistance further comprises two fixed resistances with a tap lead connected therebetween.

7. The differential charging circuit according to claim 1 wherein said active switch device further comprises a thyristor.

8. The differential charging circuit according to claim 1 wherein said active switch device further comprises a power transistor.

9. A differential charging circuit for applying charging current to a storage battery comprising:
- a transformer for amplitude modulation of AC input power, said transformer having a pair of primary terminals and a pair of secondary terminals;
- an active switch device having an input connected to a positive primary terminal of said transformer, an output, and a gate for selective switching of the AC input power;
- a current impedance device connected at one end to the output of said active switch device;
- storage capacitor connected between another one of said current impedance device and a negative primary terminal of said transformer for storing energy and reducing ripple; and
- a differential trigger circuit comprising a tapped resistance connected in parallel across the series-connected active switch and current impedance devices, and a first diode connected between a tap lead of said tapped resistance and the gate of said active switch device for controlling switching of said AC input power through said active switch and current impedance devices in accordance with a potential developed across said tapped resistance; whereby said current impedance device delays switching of said active switch device and thereby frequency modulates a charging current output therefrom relative to said AC input power.

10. The differential charging circuit according to claim 9 further comprising a second diode connected between the positive terminal of said transformer and said tapped resistance.

11. The differential charging circuit according to claim 10 wherein a negative terminal of a storage battery to be charged may be connected to said negative terminal of said transformer, and a positive terminal of said storage battery may be coupled to the interconnection of said current impedance and said storage capacitor.

12. The differential charging circuit according to claim 11 wherein said positive terminal of said storage battery is coupled between said current impedance and storage capacitor via a commutating inductance.

13. The differential charging circuit according to claim 12 further comprising a protective diode connected in parallel with said commutating inductance.

14. The differential charging circuit according to claim 10 wherein said tapped resistance further comprises a variable resistance with tap lead.

15. The differential charging circuit according to claim 10 wherein said tapped resistance further comprises two fixed resistances with a tap lead connected therebetween.

16. The differential charging circuit according to claim 10 wherein said active switch device further comprises a thyristor.

17. The differential charging circuit according to claim 10 wherein said active switch device further comprises a power transistor.

* * * * *